(12) United States Patent
Ronan

(10) Patent No.: US 10,071,806 B2
(45) Date of Patent: Sep. 11, 2018

(54) SINGLE STAGE ENGINE BLEED

(71) Applicant: Hamilton Sundstrand Corporation, Charlotte, NC (US)

(72) Inventor: Michael Ronan, East Hartford, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 406 days.

(21) Appl. No.: 14/944,479

(22) Filed: Nov. 18, 2015

(65) Prior Publication Data

US 2016/0107754 A1    Apr. 21, 2016

Related U.S. Application Data

(63) Continuation of application No. PCT/US2014/043028, filed on Jun. 18, 2014.
(Continued)

(51) Int. Cl.
*F04D 29/00* (2006.01)
*B64D 13/06* (2006.01)
(Continued)

(52) U.S. Cl.
CPC ............ *B64D 13/06* (2013.01); *F02C 6/08* (2013.01); *F02C 9/18* (2013.01);
(Continued)

(58) Field of Classification Search
None
See application file for complete search history.

(56) References Cited

U.S. PATENT DOCUMENTS 5,956,960 A * 9/1999 Niggeman ............ B64D 13/06
60/785
5,967,461 A * 10/1999 Farrington ............ B64D 13/06
244/118.5
(Continued)

FOREIGN PATENT DOCUMENTS

EP    1283166    2/2003
WO    0123724    4/2001

OTHER PUBLICATIONS

International Search Report and Written Opinion dated Oct. 29, 2014 in Application No. PCT/US2014/043028.
(Continued)

*Primary Examiner* — Igor Kershteyn
*Assistant Examiner* — Jason Fountain
(74) *Attorney, Agent, or Firm* — Snell & Wilmer, L.L.P.

(57) ABSTRACT

An environmental control system is provided. The environmental control system may receive pressurized air from a single supply line. A pressure regulating turbomachine may be located within the supply line. A motor-generator may be coupled to the pressure regulating turbomachine. In response to a pressure in the supply line being less than a desired pressure in the environmental control system, the motor-generator may supply energy to the pressure regulating turbomachine, causing the pressure regulating turbomachine to function as a compressor. In response to a pressure in the supply line being greater than a desired pressure in the environmental control system, the pressure regulating turbomachine may function as a turbine and supply energy to the motor-generator.

16 Claims, 2 Drawing Sheets

Related U.S. Application Data

(60) Provisional application No. 61/868,408, filed on Aug. 21, 2013.

(51) Int. Cl.
    *F02C 9/18*     (2006.01)
    *F02C 6/08*     (2006.01)

(52) U.S. Cl.
    CPC ............ *B64D 2013/0618* (2013.01); *B64D 2013/0644* (2013.01); *B64D 2013/0648* (2013.01); *Y02T 50/56* (2013.01)

(56) References Cited

U.S. PATENT DOCUMENTS

| | | | |
|---|---|---|---|
| 6,058,715 A * | 5/2000 | Strang | ............... B64D 13/06 62/172 |
| 2006/0231680 A1 | 10/2006 | Derouineau et al. | |
| 2007/0271952 A1 | 11/2007 | Lui et al. | |
| 2010/0314877 A1 | 12/2010 | Finney | |
| 2012/0180501 A1 | 7/2012 | Army | |
| 2013/0040545 A1 | 2/2013 | Finney | |
| 2013/0118191 A1 | 5/2013 | Zywiak et al. | |
| 2013/0187007 A1 | 7/2013 | Mackin et al. | |

OTHER PUBLICATIONS

International Preliminary Report on Patentability dated Oct. 13, 2015 in Application No. PCT/US2014/043028.
Extended European Search Report dated Jul. 6, 2016 in European Application No. 14837464.8.

* cited by examiner

SINGLE STAGE ENGINE BLEED

CROSS-REFERENCE TO RELATED APPLICATIONS

This application is a continuation of, claims priority to and the benefit of, PCT/US2014/043028 filed on Jun. 18, 2014 and entitled "SINGLE STAGE ENGINE BLEED," which claims priority from U.S. Provisional Application No. 61/868,408 filed on Aug. 21, 2013 and entitled "SINGLE STAGE ENGINE BLEED." Both of the aforementioned applications are incorporated herein by reference in their entirety.

FIELD OF INVENTION

The present disclosure relates to aircraft environmental control systems ("ECS"), and more specifically, to flow regulation and power generation in ECSs.

BACKGROUND OF THE INVENTION

Gas turbine engines (such as those used in electrical power generation or used in modern aircraft) typically include a compressor, a combustion section, and a turbine. Pressurized air from multiple stages in the compressor may be supplied to an environmental control system ("ECS"). A typical ECS may comprise flow and/or pressure regulating valves that reduce airflow and/or pressure of air bled off the high stage and low stage of the gas turbine engine. This air is conditioned (e.g., cooled and filtered) and then conducted to the cabin. As engine power output varies, the air pressure at a single location in the compressor may vary as well. Pressurized air for the ECS may be supplied from two or more different locations in the compressor. During low power output of the engine, the compressor pressure may be relatively low, and a relatively higher pressure location may be used to supply the buffer system. During high power output of the engine, the compressor pressure may be relatively high, and a relatively lower pressure location may be used to supply the ECS.

SUMMARY OF THE INVENTION

In various embodiments, an environmental control system may comprise a pressure regulating turbomachine and a motor-generator coupled to the pressure regulating turbomachine. The pressure regulating turbomachine may be located within a supply line. The pressure regulating turbomachine may be configured to supply energy to the motor-generator, and the motor-generator may be configured to supply energy to the pressure regulating turbomachine.

In various embodiments, an aircraft environmental control system may comprise an engine having a compressor and a primary generator. A supply line may be coupled to the compressor. A pressure regulating turbomachine may be located within the supply line. A motor generator may be coupled to the turbomachine and the primary generator. The motor-generator may be configured to supplement power supplied by the primary generator, in response to a pressure in the supply line being greater than a desired pressure in the aircraft environmental control system. The motor-generator may be configured to drive the pressure regulating turbomachine as a compressor, in response to a pressure in the supply line being less than a desired pressure in the aircraft environmental control system.

In various embodiments, an aircraft power distribution system comprises a primary aircraft power distribution system and a secondary aircraft power distribution system. The primary aircraft distribution system may comprise a primary generator coupled to an engine gearbox. The secondary aircraft power distribution system may comprise a pressure regulating turbomachine located within an environmental control system, and a motor-generator coupled to the pressure regulating turbomachine. The motor-generator may be configured to produce power that is supplied to the primary aircraft power distribution system through the secondary aircraft power distribution system. The motor-generator may be configured to supply power from the primary aircraft power distribution system to the pressure regulating turbomachine.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show embodiments by way of illustration. While these embodiments are described in sufficient detail to enable those skilled in the art to practice the inventions, it should be understood that other embodiments may be realized and that logical, chemical, and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

As used herein, phrases such as "make contact with," "coupled to," "touch," "interface with" and "engage" may be used interchangeably. Different cross-hatching may be used throughout the figures to denote different parts but not necessarily to denote the same or different materials.

Figure 1:
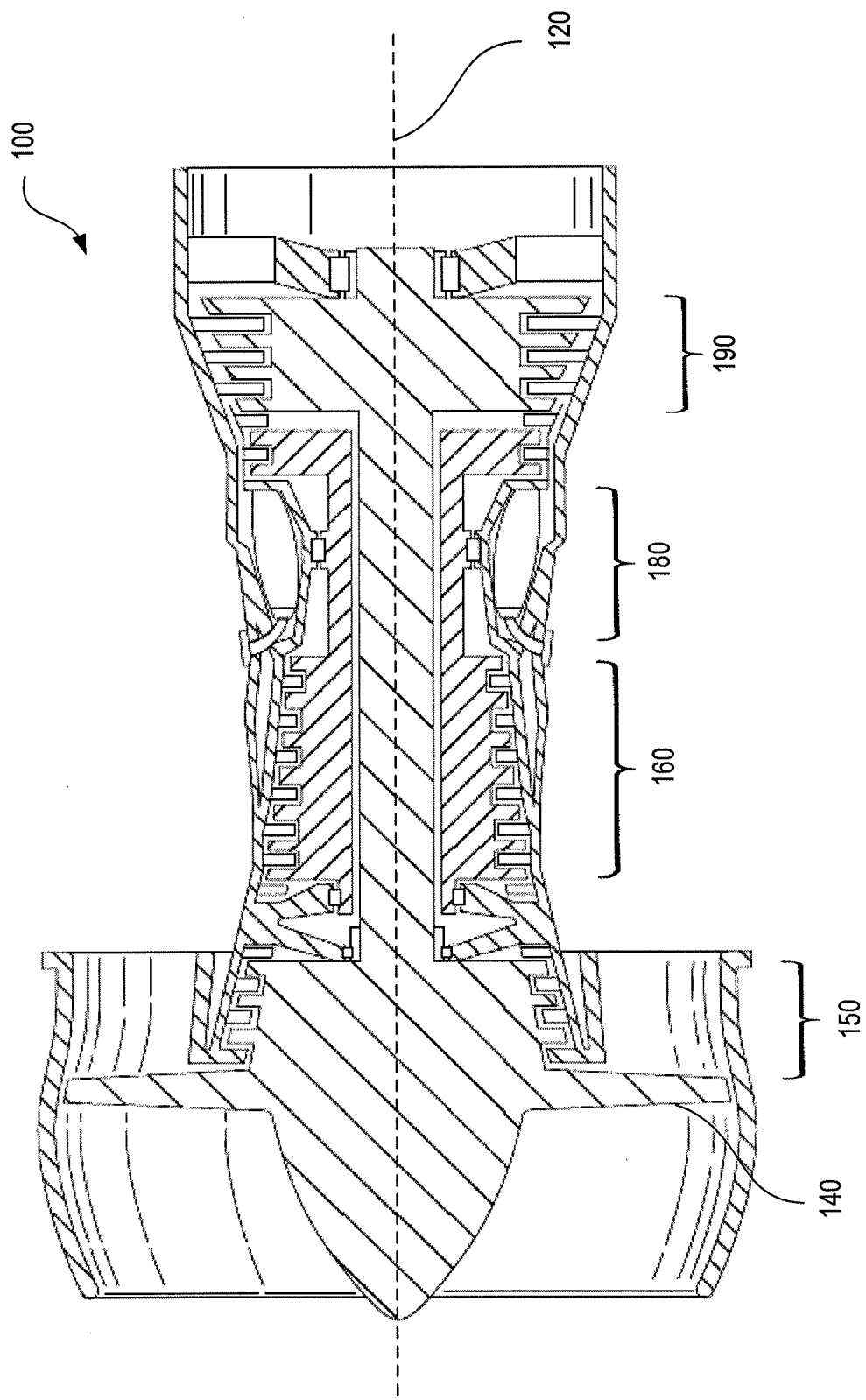
FIG. 1 illustrates a schematic axial cross-section view of a gas turbine engine according to various embodiments.

Referring to FIG. 1, a gas turbine engine 100 (such as a turbofan gas turbine engine) is illustrated according to various embodiments. Gas turbine engine 100 is disposed about axial centerline axis 120, which may also be referred to as axis of rotation 120. Gas turbine engine 100 may comprise a fan 140, low pressure compressor section 150, high pressure compressor section 160, a combustion section 180, and a turbine section 190. Air compressed in the compressor sections 150, 160 may be mixed with fuel and burned in combustion section 180 and expanded across turbine section 190. FIG. 1 provides a general understanding of the sections in a gas turbine engine, and is not intended to limit the disclosure. The present disclosure may extend to all types of turbine engines (including turbofan gas turbine engines and turbojet engines) for all types of applications.

The forward-aft positions of gas turbine engine 100 lie along axis of rotation 120. For example, fan 140 may be referred to as forward of turbine section 190 and turbine section 190 may be referred to as aft of fan 140. Typically, during operation of gas turbine engine 100, air flows from forward to aft, for example, from fan 140 to turbine section 190. As air flows from fan 140 to the more aft components of gas turbine engine 100, axis of rotation 120 may also generally define the direction of the air stream flow.

Figure 2:
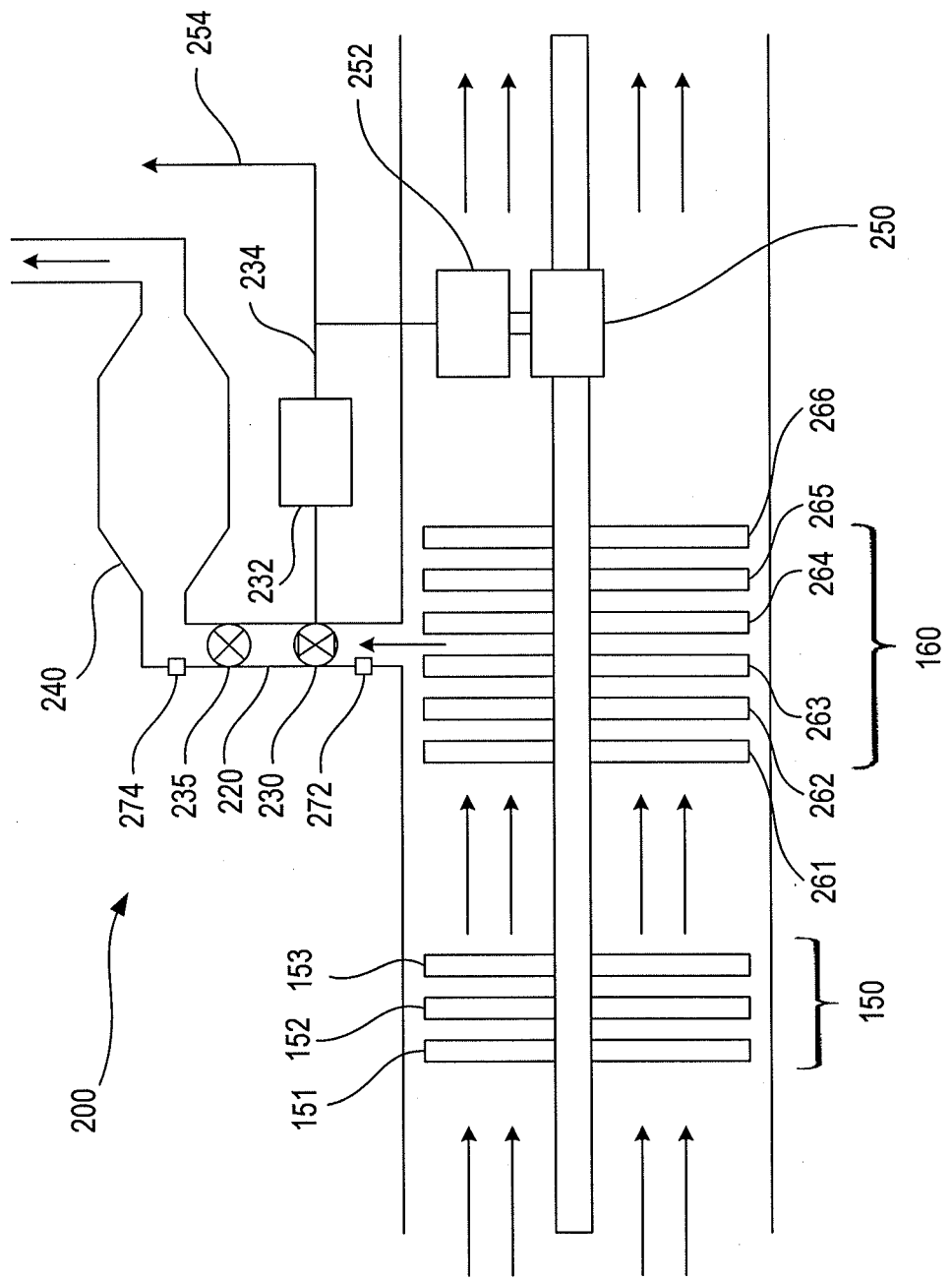
FIG. 2 illustrates a schematic view of a portion of a gas turbine engine including an environmental control system according to various embodiments.

Referring to FIG. 2, a schematic view of a portion of a gas turbine engine including an environmental control system ("ECS") 200 is illustrated according to various embodiments. In various embodiments, ECS 200 may be installed in an aircraft nacelle. For example, ECS 200 may be installed in between the engine and the outer nacelle housing (e.g., in the engine build-up zone).

ECS 200 may comprise a pressure regulating turbomachine ("PRT") 230 located within a supply line 220, a pressure regulating valve 235 downstream of PRT 230, and a precooler 240 downstream of PRT 230 and pressure regulating valve 235. PRT 230 may be coupled to and/or configured to drive a motor-generator 232. PRT 230 and/or motor-generator 232 may further be coupled to (and/or be in electronic communication with) an aircraft power distribution system 254 (e.g., aircraft wiring or power management components such as a power bus) in the aircraft. More specifically, motor-generator 232 may be configured to generate electricity that is conducted to a power supply system of the aircraft, and motor-generator may be configured to transmit energy from the power supply system of the aircraft to PRT 230. Precooler 240 may be configured to cool and/or filter the air supplied from high pressure compressor section 160.

In various embodiments, an aircraft power supply system may comprise a primary generator 252. Primary generator 252 may be coupled to or be driven by an auxiliary gearbox 250. Auxiliary gearbox 250 may be installed on and/or may be a portion of a gas turbine engine (e.g., an auxiliary power unit ("APU") or main engine) of the aircraft. Primary generator 252 may be coupled to and/or may be configured to supply electricity to aircraft power distribution system 254.

In various embodiments, PRT 230 may be any suitable turbomachine. For example, PRT 230 may be a pressure regulating turbine. PRT 230 may be configured as an axial turbine and/or a centrifugal turbine. PRT 230 may be installed in a supply line 220 that is configured to conduct air from at least one of low pressure compressor section 150 and high pressure compressor section 160 to an aircraft body. This air may be conducted to and cause PRT 230 to spin. PRT 230 may comprise a shaft that couples to a turbine wheel of PRT 230, which in turn is mechanically coupled to motor-generator 232. Spinning of PRT 230 may cause the motor-generator 232 to generate electricity derived from the mechanical movement of PRT 230. The electricity generated by motor-generator 232 may be conducted over a secondary power distribution system 234. Secondary power distribution system 234 may connect to and/or be in electronic communication with motor-generator 232 and/or aircraft power distribution system 254.

In various embodiments, PRT 230 may be configured to manage and/or regulate the pressure of the air from supply line 220. In this regard, the pressure of the air supplied to precooler 240 from PRT 230 may be sufficiently reduced for cooling and/or handling in precooler 240, based on the pressure drop across PRT 230. Moreover, the pressure drop of the air across PRT 230 may cause a temperature reduction, increasing the cooling efficiency of precooler 240. Additionally, the expansion of air and associated reduction of temperature may allow for a relatively smaller precooler 240.

As air flows through low pressure compressor section 150 and high pressure compressor section 160, air pressure increases at each stage 151, 152, and 153 of low pressure compressor section 150 and each stage 261, 262, 263, 264, 265, and 266 of high pressure compressor section 160. In various embodiments, and as illustrated in FIG. 2, supply line 220 may be located between third stage 263 and fourth stage 264 of high pressure compressor section 160. In various embodiments, supply line 220 may be located in different locations, such as forward of low pressure compressor section 210, between stages of low pressure compressor section 150, between low pressure compressor section 150 and high pressure compressor section 160, between stages of high pressure compressor section 160, and aft of high pressure compressor section 160. In various embodiments, only one supply line 220 may be necessary for ECS 200, due to the fact that PRT 230 may add pressure to ECS 200 in response to the pressure at supply line 220 being less than the desired pressure for ECS 200.

The selected location for supply line 220 may vary based on different engine and aircraft specifications. For example, in various embodiments, an aircraft may require 60 psi in the ECS 200. At supply line 220, the pressure may vary from 25-30 psi at idle, to 110-130 psi at cruise, and to 330 psi at maximum power during takeoff.

During engine operation, the air pressures at supply line 220 may vary. For example, during engine idle the air pressures may be relatively low, during takeoff the air pressures may be relatively high, and during cruise the air pressures may be between those during idle and takeoff. For example, during engine idle, the desired pressure in ECS 200 may be greater than is available at supply line 220. Conversely, during takeoff the desired pressure in ECS 200 may be less than the air pressure at supply line 220.

In various embodiments, in response to the pressure at supply line 220 being less than the desired pressure for ECS 200, motor-generator 232 may add energy to ECS 200. For example, motor-generator 232 may drive PRT 230, causing PRT 230 to act as a compressor and increase the pressure in ECS 200. Thus, even in response to a pressure at supply line 220 being less than a desired pressure in ECS 200, supply line 220 may still be used to supply pressurized air which may be supplemented by motor-generator 232 and PRT 230 in order to achieve the desired pressure in ECS 200.

In various embodiments, a location of supply line 220 may be selected such that a minimum pressure at supply line 220 is less than the desired pressure in ECS 200, and a maximum pressure at supply line 220 is greater than the desired pressure in ECS 200. For example, during idle the pressure at supply line 220 may be less than the desired pressure in ECS 200, and during takeoff the pressure at supply line 220 may be greater than the desired pressure in ECS 200. In various embodiments, a location for supply line 220 may be selected such that a pressure at supply line 220 is within a predetermined range above the desired pressure in ECS 200 during cruise, such as 10-20% greater than the desired pressure in ECS 200, or 5-40% greater than the desired pressure in ECS 200. Such a selection may improve efficiency by causing PRT 230 to act as a turbine during a majority of flight time without unnecessarily bleeding expensive high pressure air from high pressure compressor section 160.

In response to the pressure at supply line 220 being greater than the desired pressure in ECS 200, PRT 230 may act as a turbine and may remove energy from ECS 200. Motor-generator 232 may add this energy to aircraft power distribution system 254. In various embodiments, motor-generator 232 may store this energy in a battery or other storage mechanism (e.g. a flywheel). In various embodiments, motor-generator 232 may be electrically coupled to primary generator 252. In response to the pressure at supply line 220 being less than the desired pressure in ECS 200, motor-generator 232 may obtain energy from primary generator 252 and may transmit the obtained energy to PRT 230, causing PRT 230 to act as a compressor. For example, motor generator-232 may convert electrical energy from primary generator 252 to mechanical energy which is used to rotate PRT 230.

In various embodiments, PRT 230 may be adjustable and/or may comprise a variable output geometry. In this regard, PRT 230 may be configured to regulate downstream pressure and/or flow that is supplied to precooler 240. Moreover, ECS 200 may be configured with at least one of an upstream sensor 272 and a downstream sensor 274. Upstream sensor 272 may be located in ECS 200 upstream of PRT 230, and downstream sensor 274 may be located in ECS 200 downstream of PRT 230. Upstream sensor 272 may be configured to measure a pressure and/or flow rate upstream of PRT 230, and downstream sensor 274 may be configured to measure a pressure and/or flow rate downstream of PRT 230. ECS 200, motor-generator 232, and/or PRT 230 may be capable of receiving the measurement from sensors 272, 274. Based on the measurement, ECS 200 and/or PRT 230 may be adjusted to supply a suitable amount of pressure and/or airflow to precooler 240. To regulate the pressure and/or airflow, PRT 230 may be configured with an adjustable exhaust nozzle and/or a variable area exhaust nozzle.

In various embodiments, pressure regulating valve 235 may be a pressure regulating or flow control valve that is configured to receive a measured pressure and/or flow from sensors 272, 274. In this regard, pressure regulating valve 235 may be configured to adjust and/or manage the air input to precooler 240. In various embodiments, pressure regulating valve 235 may be a shut off valve.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. Different cross-hatching may be used throughout the figures to denote different parts but not necessarily to denote the same or different materials. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. An environmental control system comprising:
   a pressure regulating turbomachine located within a supply line, wherein a location of the supply line is selected such that a minimum pressure in the supply line is less than a desired pressure in the environmental control system, and wherein a maximum pressure in the supply line is greater than the desired pressure in the environmental control system;
   a motor-generator coupled to the pressure regulating turbomachine, and
   a primary generator coupled to the motor-generator;
   wherein the pressure regulating turbomachine is configured to supply energy to the motor-generator,
   wherein the motor-generator is configured to supply energy to the pressure regulating turbomachine; and
   wherein in response to the pressure in the supply line being less than a desired pressure in the environmental control system, the primary generator transmits energy to the motor generator causing the pressure regulating turbomachine to increase pressure in the supply line.

2. The environmental control system of claim 1, wherein the pressure regulating turbomachine is configured to supply energy to the motor-generator in response to a pressure in the supply line being greater than the desired pressure in the environmental control system.

3. The environmental control system of claim 1, wherein the motor-generator is configured to supply energy to the pressure regulating turbomachine in response to a pressure in the supply line being less than the desired pressure of the environmental control system.

4. The environmental control system of claim 1, further comprising a precooler in fluid communication with the pressure regulating turbomachine.

5. The environmental control system of claim 1, wherein the supply line receives pressurized air from a high pressure compressor in a gas turbine engine.

6. The environmental control system of claim 1, wherein the environmental control system consists of only one supply line.

7. The environmental control system of claim 1, further comprising at least one of a downstream pressure sensor and an upstream pressure sensor.

8. An aircraft environmental control system comprising:
a gas turbine engine including a compressor and a primary generator;
a supply line coupled to the compressor, wherein a pressure in the supply line is less than a desired pressure in the aircraft environmental control system during idle, and wherein the pressure in the supply line is greater than the desired pressure in the aircraft environmental control system during cruise;
a pressure regulating turbomachine located within the supply line; and
a motor-generator coupled to the pressure regulating turbomachine and the primary generator,
wherein in response to the pressure in the supply line being less than a desired pressure in the environmental control system, the primary generator transmits energy to the motor generator causing the pressure regulating turbomachine to increase pressure in the supply line.

9. The aircraft environmental control system of claim 8, wherein the pressure regulating turbomachine is configured to function as a compressor and a turbine.

10. The aircraft environmental control system of claim 8, wherein the motor-generator is configured to supplement power supplied by the primary generator in response to a pressure in the supply line being greater than the desired pressure in the aircraft environmental control system.

11. The aircraft environmental control system of claim 8, further comprising a precooler downstream of the pressure regulating turbomachine.

12. The aircraft environmental control system of claim 8, wherein the aircraft environmental control system comprises only one supply line.

13. An aircraft power distribution system comprising:
a primary aircraft power distribution system comprising a primary generator coupled to an engine gearbox and to a motor-generator; and
a secondary aircraft power distribution system comprising:
a pressure regulating turbomachine located within a supply line, wherein a pressure in the supply line is less than a desired pressure in an environmental control system during idle, and wherein the pressure in the supply line is greater than the desired pressure in the environmental control system during cruise;
the motor-generator coupled to the pressure regulating turbomachine,
wherein the motor-generator is configured to produce power that is supplied to the primary aircraft power distribution system through the secondary aircraft power distribution system,
wherein the motor-generator is configured to supply power from the primary aircraft power distribution system to the pressure regulating turbomachine, and
wherein in response to the pressure in the supply line being less than the desired pressure in the environmental control system, the primary generator transmits energy to the motor generator causing the pressure regulating turbomachine to increase pressure in the supply line.

14. The aircraft power distribution system of claim 13, wherein the motor-generator is configured to produce power that is supplied to the primary aircraft power distribution system in response to a pressure in the environmental control system being greater than the desired pressure in the environmental control system.

15. The aircraft power distribution system of claim 13, wherein the motor-generator is configured to supply power from the primary aircraft power distribution system to the pressure regulating turbomachine in response to a pressure in the environmental control system being less than the desired pressure in the environmental control system.

16. The aircraft power distribution system of claim 13, wherein the environmental control system consists of a single supply line.

* * * * *